United States Patent
Daimon

(10) Patent No.: US 11,536,008 B2
(45) Date of Patent: Dec. 27, 2022

(54) WORK VEHICLE, SYSTEM INCLUDING WORK VEHICLE, AND LOAD WEIGHT CALCULATION METHOD FOR WORK VEHICLE

(71) Applicant: KOMATSU LTD., Tokyo (JP)

(72) Inventor: Masaki Daimon, Tokyo (JP)

(73) Assignee: KOMATSU LTD., Tokyo (JP)

( * ) Notice: Subject to any disclaimer, the term of this patent is extended or adjusted under 35 U.S.C. 154(b) by 353 days.

(21) Appl. No.: 16/652,798

(22) PCT Filed: Feb. 12, 2019

(86) PCT No.: PCT/JP2019/004820
§ 371 (c)(1),
(2) Date: Apr. 1, 2020

(87) PCT Pub. No.: WO2019/171885
PCT Pub. Date: Sep. 12, 2019

(65) Prior Publication Data
US 2020/0232190 A1  Jul. 23, 2020

(30) Foreign Application Priority Data
Mar. 5, 2018 (JP) .............................. JP2018-038576

(51) Int. Cl.
| E02F 9/26 | (2006.01) |
| E02F 3/28 | (2006.01) |
| G01G 19/10 | (2006.01) |
| G01G 19/12 | (2006.01) |

(52) U.S. Cl.
CPC ............... *E02F 9/26* (2013.01); *E02F 9/264* (2013.01); *G01G 19/10* (2013.01); *G01G 19/12* (2013.01); *E02F 3/283* (2013.01)

(58) Field of Classification Search
CPC ......... E02F 3/283; E02F 3/431; E02F 9/0841; E02F 9/26; E02F 9/264; G01G 19/083; G01G 19/10; G01G 19/12
See application file for complete search history.

(56) References Cited

U.S. PATENT DOCUMENTS

| 5,067,572 A | * | 11/1991 | Kyrtsos | .................. | E02F 9/264 |
| | | | | | 177/25.14 |
| 5,850,341 A | * | 12/1998 | Fournier | ............... | E02F 9/2045 |
| | | | | | 701/34.2 |
| 9,157,215 B2 | * | 10/2015 | Stanley | ................. | E02F 9/2296 |
| 10,597,852 B2 | * | 3/2020 | Hori | ....................... | E02F 9/264 |

(Continued)

FOREIGN PATENT DOCUMENTS

| CN | 1641324 A | 7/2005 |
| CN | 102985725 A | 3/2013 |

(Continued)

*Primary Examiner* — Tyler J Lee
(74) *Attorney, Agent, or Firm* — Faegre Drinker Biddle & Reath LLP

(57) ABSTRACT

A first processor determines a loaded state of a bucket, makes a determination that a traveling apparatus has performed an operation for shifting from a rearward movement state to a state (forward movement or stop) other than the rearward movement state in the loaded state, and calculates a load weight of the bucket from a detection value of a work implement sensor (first hydraulic pressure detectors and a first angle detector) based on the determination.

11 Claims, 9 Drawing Sheets

(56) References Cited

U.S. PATENT DOCUMENTS

| | | | |
|---|---|---|---|
| 2005/0167164 A1 | 8/2005 | Takeda | |
| 2012/0296531 A1* | 11/2012 | Hyodo | E02F 9/264 701/50 |
| 2013/0073151 A1* | 3/2013 | Wada | E02F 9/2217 701/50 |
| 2013/0136624 A1* | 5/2013 | Kitao | F16H 61/444 417/212 |
| 2013/0327595 A1* | 12/2013 | Moriguchi | E02F 9/202 184/6.12 |
| 2014/0039772 A1* | 2/2014 | Jensen | B60K 23/0808 701/69 |
| 2014/0156222 A1 | 6/2014 | Roos | |
| 2015/0006010 A1* | 1/2015 | Ito | E02F 9/2235 903/930 |
| 2015/0354178 A1* | 12/2015 | Jeong | E02F 9/267 340/438 |
| 2016/0060847 A1* | 3/2016 | Roach | E02F 9/264 701/50 |
| 2017/0131134 A1 | 5/2017 | Kang | |
| 2017/0167115 A1 | 6/2017 | Lee et al. | |
| 2018/0051445 A1 | 2/2018 | Hori et al. | |

FOREIGN PATENT DOCUMENTS

| | | |
|---|---|---|
| CN | 103534563 A | 1/2014 |
| CN | 107208405 A | 9/2017 |
| EP | 3249118 A1 | 11/2017 |
| EP | 3719223 A1 | 10/2020 |
| JP | S60-080721 A | 5/1985 |
| JP | H02-132581 A | 5/1990 |
| JP | 2001-099701 A | 4/2001 |
| JP | 2005-227270 A | 8/2005 |
| JP | 2006-336390 A | 12/2006 |
| JP | 2017-008633 A | 1/2017 |
| WO | WO 2012/005670 A1 | 1/2012 |
| WO | WO-2016/208275 A1 | 12/2016 |

* cited by examiner

WORK VEHICLE, SYSTEM INCLUDING WORK VEHICLE, AND LOAD WEIGHT CALCULATION METHOD FOR WORK VEHICLE

TECHNICAL FIELD

The present disclosure relates to a work vehicle, a system including the work vehicle, and a load weight calculation method for the work vehicle.

BACKGROUND ART

An amount of production is important in managing productivity and fuel efficiency of a wheel loader. A load weight (carrying load: load value in a bucket) is also important in knowing the amount of production. The technique of measuring the load weight in the wheel loader is disclosed in, for example, Japanese Patent Laying-Open No. 2001-99701 (PTL 1).

In PTL 1, a load weight from when a boom starts to rise to when the boom stops is obtained the predetermined number of times.

CITATION LIST

Patent Literature

PTL 1: Japanese Patent Laying-Open No. 2001-99701

SUMMARY OF INVENTION

Technical Problem

In a wheel loader, a boom-raising operation may be performed even when loading is not performed as in a piling operation. In this case, a load weight may be cumulatively added by mistake, and thus, a cumulative or average load weight cannot be measured correctly.

In addition, a boom cylinder pressure may be unstable during the boom-raising operation. Therefore, the load weight measured based on the boom cylinder pressure cannot be measured accurately in some cases.

An object of the present disclosure is to provide a work vehicle capable of accurately measuring a load weight, a system including the work vehicle, and a load weight calculation method for the work vehicle.

Solution to Problem

A work vehicle according to the present disclosure includes: a vehicular body; a work implement; a traveling apparatus; a work implement sensor; a traveling sensor; and a controller. The work implement is attached to the vehicular body and includes a bucket. The traveling apparatus is attached to the vehicular body and causes the vehicular body to travel. The work implement sensor senses a state of the work implement. The traveling sensor senses a traveling state of the traveling apparatus. The controller determines a loaded state of the bucket, makes a determination that the traveling apparatus has performed an operation for shifting from a rearward movement state to a state other than the rearward movement state in the loaded state, and calculates a load weight of the bucket from a detection value of the work implement sensor based on the determination.

Advantageous Effects of Invention

According to the present disclosure, the load weight of the bucket is calculated based on the determination that the traveling apparatus has performed the operation for shifting from the rearward movement state to a state other than the rearward movement state. Therefore, a work vehicle capable of accurately measuring a load weight, a system including the work vehicle, and a load weight calculation method for the work vehicle can be achieved.

DESCRIPTION OF EMBODIMENTS

Figure 1:
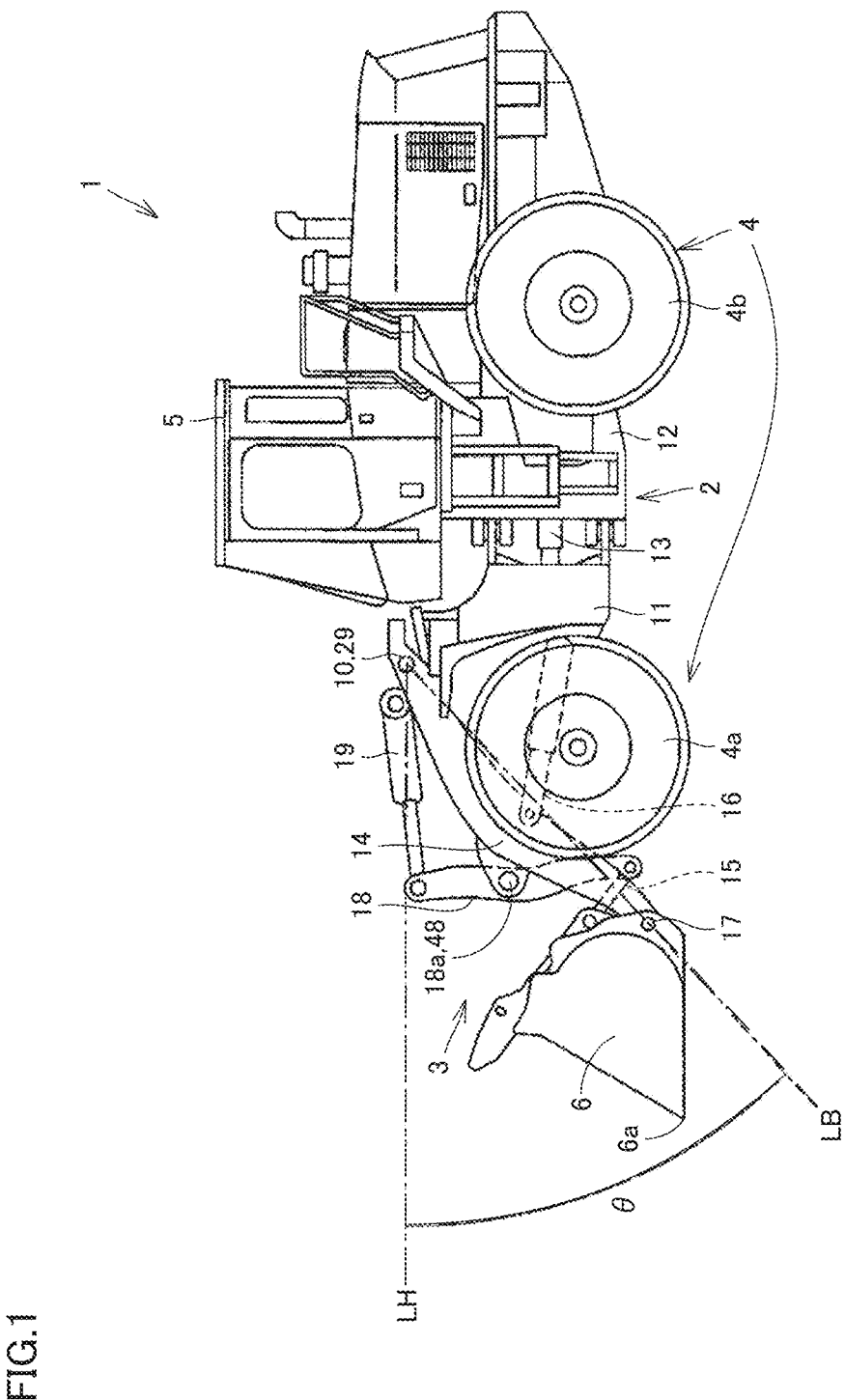
FIG. 1 is a side view of a wheel loader which is one example of a work vehicle according to an embodiment.

An embodiment will be described hereinafter with reference to the drawings. In the following description, the same components are denoted by the same reference characters, and their designations and functions are also the same. Therefore, detailed description thereof will not be repeated.

<Overall Configuration>

In the embodiment, a wheel loader 1 will be described by way of example of a work vehicle. FIG. 1 is a side view of wheel loader 1 which is one example of the work vehicle according to the embodiment.

As shown in FIG. 1, wheel loader 1 includes a vehicular body frame 2, a work implement 3, a traveling apparatus 4, and a cab 5. A vehicular body of wheel loader 1 is constituted of vehicular body frame 2, cab 5 and the like. Work implement 3 and traveling apparatus 4 are attached to the vehicular body of wheel loader 1.

Traveling apparatus 4 causes the vehicular body of wheel loader 1 to travel, and includes running wheels 4a and 4b. Wheel loader 1 is movable as running wheels 4a and 4b are rotationally driven, and can perform a desired work using work implement 3.

Vehicular body frame 2 includes a front frame 11 and a rear frame 12. Front frame 11 and rear frame 12 are attached to each other so as to be swingable in a left-right direction. A steering cylinder 13 is attached to front frame 11 and rear frame 12. Steering cylinder 13 is a hydraulic cylinder. When steering cylinder 13 extends and contracts by a hydraulic oil from a steering pump (not shown), a direction of travel of wheel loader 1 is laterally changed.

In the present specification, a direction in which wheel loader 1 travels straightforward is referred to as a front-rear direction of wheel loader 1. In the front-rear direction of wheel loader 1, a side where work implement 3 is arranged with respect to vehicular body frame 2 is referred to as a frontward direction, and a side opposite to the frontward direction is referred to as a rearward direction. A left-right direction of wheel loader 1 is a direction orthogonal to the front-rear direction as seen in a plan view. A right side and a left side in the left-right direction when facing front are defined as a right direction and a left direction, respectively. A top-bottom direction of wheel loader 1 is a direction orthogonal to a plane defined by the front-rear direction and the left-right direction. In the top-bottom direction, a ground side is defined as a lower side and a sky side is defined as an upper side.

The front-rear direction refers to a front-rear direction with respect to an operator sitting on an operator's seat in cab 5. The left-right direction refers to a left-right direction with respect to the operator sitting on the operator's seat. The left-right direction refers to a vehicular width direction of wheel loader 1. The top-bottom direction refers to a top-bottom direction with respect to the operator sitting on the operator's seat. A direction in which the operator sitting on the operator's seat faces is defined as the frontward direction, and a backward direction with respect to the operator sitting on the operator's seat is defined as the rearward direction. A right side and a left side when the operator sitting on the operator's seat faces front are defined as the right direction and the left direction, respectively. A foot side and a head side of the operator sitting on the operator's seat are defined as the lower side and the upper side, respectively.

Work implement 3 and running wheel (front wheel) 4a are attached to front frame 11. Work implement 3 includes a boom 14 and a bucket 6. A base end of boom 14 is rotatably attached to front frame 11 by a boom pin 10. Bucket 6 is rotatably attached to boom 14 by a bucket pin 17 located at a tip of boom 14. Front frame 11 and boom 14 are coupled to each other by a boom cylinder 16. Boom cylinder 16 is a hydraulic cylinder. When boom cylinder 16 extends and contracts by a hydraulic oil from a work implement pump 25 (see FIG. 2), boom 14 is raised and lowered. Boom cylinder 16 drives boom 14.

Work implement 3 further includes a bell crank 18, a tilt cylinder 19 and a tilt rod 15. Bell crank 18 is rotatably supported on boom 14 by a support pin 18a located substantially in the center of boom 14. Tilt cylinder 19 couples a base end of bell crank 18 to front frame 11. Tilt rod 15 couples a tip of bell crank 18 to bucket 6. Tilt cylinder 19 is a hydraulic cylinder. When tilt cylinder 19 extends and contracts by the hydraulic oil from work implement pump 25 (see FIG. 2), bucket 6 pivots upward and downward. Tilt cylinder 19 drives bucket 6.

Cab 5 and running wheel (rear wheel) 4b are attached to rear frame 12. Cab 5 is arranged behind boom 14. Cab 5 is placed on vehicular body frame 2. A seat on which the operator sits, an operation apparatus and the like are arranged in cab 5.

Figure 2:
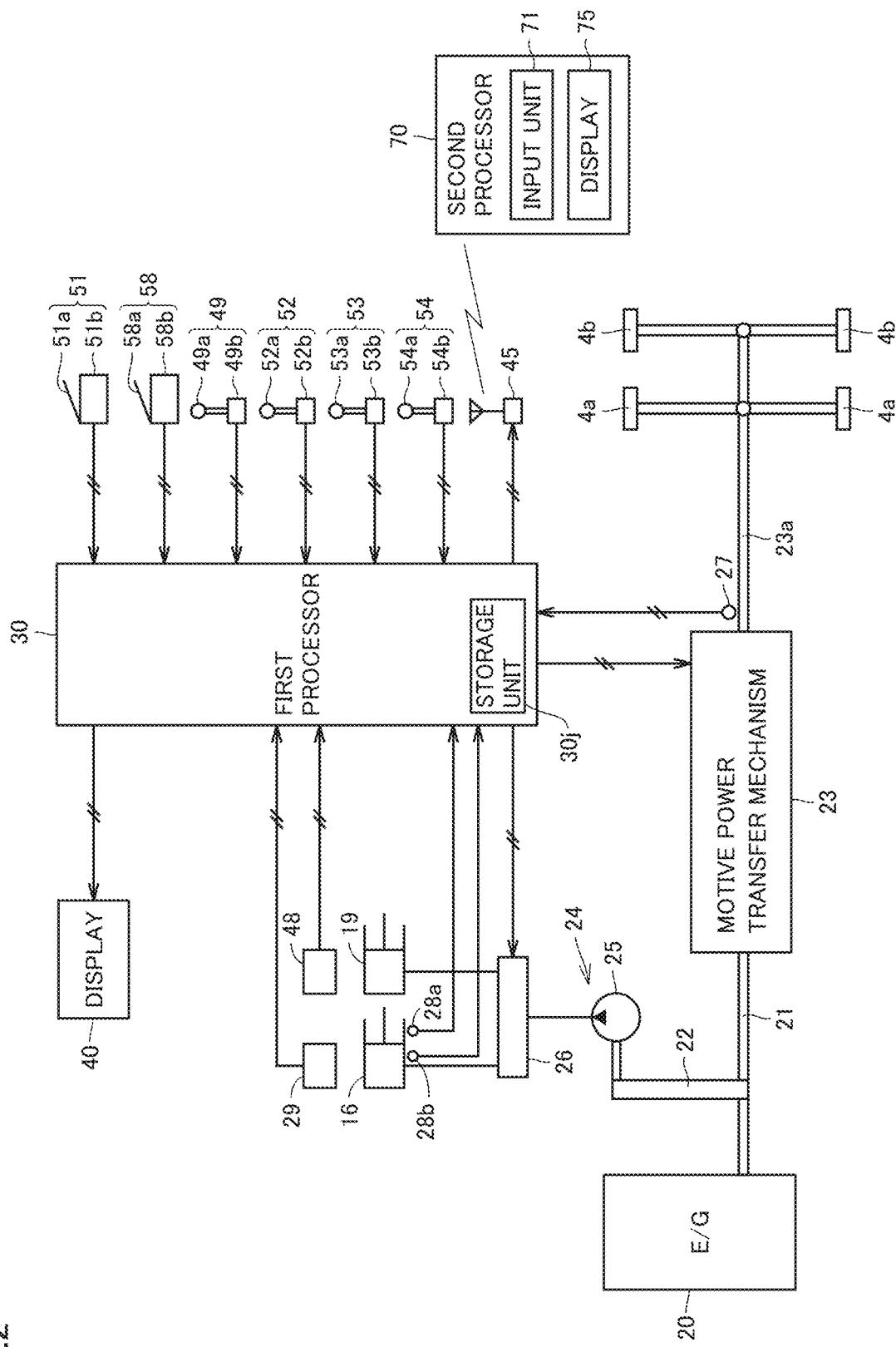
FIG. 2 is a schematic block diagram of the wheel loader.

FIG. 2 is a schematic block diagram showing a configuration of wheel loader 1. Wheel loader 1 includes an engine 20, a motive power extraction unit 22, a motive power transfer mechanism 23, a cylinder driving unit 24, a first angle detector 29, a second angle detector 48, and a first processor 30 (controller).

Engine 20 is, for example, a diesel engine. An output of engine 20 is controlled by adjusting an amount of fuel injected into a cylinder of engine 20.

Motive power extraction unit 22 is a device that divides the output of engine 20 into motive power transfer mechanism 23 and cylinder driving unit 24.

Motive power transfer mechanism 23 is a mechanism that transfers the driving force from engine 20 to front wheel 4a and rear wheel 4b, and is a transmission, for example. Motive power transfer mechanism 23 changes a speed of rotation of an input shaft 21 and outputs the rotation to an output shaft 23a.

A vehicle speed detection unit 27 that detects a vehicle speed of wheel loader 1 is attached to output shaft 23a of motive power transfer mechanism 23. Wheel loader 1 includes vehicle speed detection unit 27. Vehicle speed detection unit 27 is, for example, a vehicle speed sensor. Vehicle speed detection unit 27 detects a rotation speed of output shaft 23a, thereby detecting a movement speed of wheel loader 1 by traveling apparatus 4 (FIG. 1). Vehicle speed detection unit 27 functions as a rotation sensor that detects the rotation speed of output shaft 23a. Vehicle speed detection unit 27 functions as a movement detector that detects the movement by traveling apparatus 4. Vehicle speed detection unit 27 outputs a detection signal indicating the vehicle speed of wheel loader 1 to first processor 30.

Cylinder driving unit 24 includes work implement pump 25 and a control valve 26. The output of engine 20 is transferred to work implement pump 25 through motive power extraction unit 22. The hydraulic oil discharged from work implement pump 25 is supplied to boom cylinder 16 and tilt cylinder 19 through control valve 26.

First hydraulic pressure detectors 28a and 28b that detect a hydraulic pressure in an oil chamber of boom cylinder 16 are attached to boom cylinder 16. Wheel loader 1 includes first hydraulic pressure detectors 28a and 28b. First hydraulic pressure detectors 28a and 28b include, for example, a pressure sensor 28a for detection of a head pressure, and a pressure sensor 28b for detection of a bottom pressure.

Pressure sensor 28a is attached to the head side of boom cylinder 16. Pressure sensor 28a can detect a pressure (head pressure) of the hydraulic oil in the cylinder-head-side oil chamber of boom cylinder 16. Pressure sensor 28a outputs a detection signal indicating the head pressure of boom cylinder 16 to first processor 30.

Pressure sensor 28b is attached to the bottom side of boom cylinder 16. Pressure sensor 28b can detect a pressure (bottom pressure) of the hydraulic oil in the cylinder-bottom-side oil chamber of boom cylinder 16. Pressure sensor 28b outputs a detection signal indicating the bottom pressure of boom cylinder 16 to first processor 30.

First angle detector 29 is, for example, a potentiometer attached to boom pin 10. First angle detector 29 detects a boom angle indicating a lift angle (tilt angle) of boom 14. First angle detector 29 outputs a detection signal indicating the boom angle to first processor 30.

Specifically, as shown in FIG. 1, a boom angle θ refers to an angle of a straight line LB extending in a direction from a center of boom pin 10 toward a center of bucket pin 17, with respect to a horizontal line extending forward from the center of boom pin 10. A case in which straight line LB is horizontal is defined as boom angle θ=0°. A case in which straight line LB is located above the horizontal line is defined as positive boom angle θ. A case in which straight line LB is located below the horizontal line is defined as negative boom angle θ.

First angle detector 29 may be a stroke sensor arranged in boom cylinder 16.

Second angle detector 48 is, for example, a potentiometer attached to support pin 18a. Second angle detector 48 detects an angle (bell crank angle) of bell crank 18 with respect to boom 14, thereby detecting a bucket angle indicating a tilt angle of bucket 6 with respect to boom 14. Second angle detector 48 outputs a detection signal indicating the bucket angle to first processor 30. The bucket angle is, for example, an angle formed by straight line LB and a straight line that connects a center of bucket pin 17 and a cutting edge 6a of bucket 6.

Second angle detector 48 may be a stroke sensor arranged in tilt cylinder 19.

As shown in FIG. 2, wheel loader 1 includes, in cab 5, an operation apparatus operated by the operator. The operation apparatus includes a forward and rearward movement switching apparatus 49, an accelerator operation apparatus 51, a boom operation apparatus 52, a speed change operation apparatus 53, a bucket operation apparatus 54, and a brake operation apparatus 58.

Forward and rearward movement switching apparatus 49 includes a forward and rearward movement switching operation member 49a and a forward and rearward movement switching detection sensor 49b. Forward and rearward movement switching operation member 49a is operated by the operator to provide an instruction to switch between forward movement and rearward movement of the vehicle. Forward and rearward movement switching operation member 49a can be switched to each of a forward movement (F) position, a neutral (N) position and a rearward movement (R) position. Forward and rearward movement switching detection sensor 49b detects a position of forward and rearward movement switching operation member 49a. Forward and rearward movement switching detection sensor 49b outputs, to first processor 30, a detection signal (forward movement, neutral, rearward movement) about the forward and rearward movement instruction indicated by the position of forward and rearward movement switching operation member 49a. Forward and rearward movement switching apparatus 49 includes an FNR switching lever that can perform switching among forward movement (F), neutral (N) and rearward movement (R).

Accelerator operation apparatus 51 includes an accelerator operation member 51a and an accelerator operation detection unit 51b. Accelerator operation member 51a is operated by the operator to set a target rotation speed of engine 20. Accelerator operation detection unit 51b detects an amount of operation (amount of accelerator operation) of accelerator operation member 51a. Accelerator operation detection unit 51b outputs a detection signal indicating the amount of accelerator operation to first processor 30.

Brake operation apparatus 58 includes a brake operation member 58a and a brake operation detection unit 58b. Brake operation member 58a is operated by the operator to control the deceleration force of wheel loader 1. Brake operation detection unit 58b detects an amount of operation (amount of brake operation) of brake operation member 58a. Brake operation detection unit 58b outputs a detection signal indicating the amount of brake operation to first processor 30. A pressure of a brake oil may be used as the amount of brake operation.

Boom operation apparatus 52 includes a boom operation member 52a and a boom operation detection unit 52b. Boom operation member 52a is operated by the operator to raise or lower boom 14. Boom operation detection unit 52b detects a position of boom operation member 52a. Boom operation detection unit 52b outputs, to first processor 30, a detection signal about the boom 14—raising instruction or the boom 14—lowering instruction indicated by the position of boom operation member 52a.

Speed change operation apparatus 53 includes a speed change operation member 53a and a speed change operation detection unit 53b. Speed change operation member 53a is operated by the operator to control a speed change from input shaft 21 to output shaft 23a in motive power transfer mechanism 23. Speed change operation detection unit 53b detects a position of speed change operation member 53a. Speed change operation detection unit 53b outputs, to first processor 30, a detection instruction about the speed change indicated by the position of speed change operation member 53a.

Bucket operation apparatus 54 includes a bucket operation member 54a and a bucket operation detection unit 54b. Bucket operation member 54a is operated by the operator to cause bucket 6 to perform an excavation operation or a dumping operation. Bucket operation detection unit 54b detects a position of bucket operation member 54a. Bucket operation detection unit 54b outputs, to first processor 30, a detection signal about the instruction to operate bucket 6 in a tilting back direction or a dumping direction, which is indicated by the position of bucket operation member 54a.

First angle detector 29, second angle detector 48, first hydraulic pressure detectors 28a and 28b, boom operation detection unit 52b, and bucket operation detection unit 54b are included in a work implement sensor. The work implement sensor senses a state of work implement 3. A load weight W in bucket 6 can be calculated from a detection value of the work implement sensor. The work implement sensor includes at least one of a pressure sensor or a strain sensor. The work implement sensor includes a work implement position sensor. The work implement position sensor is, for example, constituted of first angle detector 29, second angle detector 48, boom operation detection unit 52b, and bucket operation detection unit 54b.

In addition, forward and rearward movement switching apparatus 49, vehicle speed detection unit 27, accelerator operation detection unit 51b, and brake operation detection unit 58b are included in a traveling sensor. The traveling sensor senses a traveling state of traveling apparatus 4.

First processor 30 is implemented by a microcomputer including a storage device such as a RAM (Random Access Memory) and a ROM (Read Only Memory), and a computing device such as a CPU (Central Processing Unit). First processor 30 may be implemented as a part of the function of the controller of wheel loader 1 that controls the operation of engine 20, work implement 3 (such as boom cylinder 16 and tilt cylinder 19), motive power transfer mechanism 23 and the like. The signal about the forward and rearward movement instruction detected by forward and rearward movement switching apparatus 49, the signal about the vehicle speed of wheel loader 1 detected by vehicle speed detection unit 27, the signal about the boom angle detected by first angle detector 29, the signal about the head pressure of boom cylinder 16 detected by pressure sensor 28a, and the signal about the bottom pressure of boom cylinder 16 detected by pressure sensor 28b are mainly input to first processor 30. Based on the above-described input signals, first processor 30 sums the transportation work information about a load in bucket 6. The transportation work information includes, for example, the load weight of the load in bucket 6.

Wheel loader 1 further includes a display 40 and an output unit 45. Display 40 is implemented by a monitor arranged in cab 5 and viewed by the operator. Display 40 displays the transportation work information obtained by first processor 30.

Output unit 45 outputs the transportation work information to a server (second processor 70) placed outside wheel loader 1. Output unit 45 may, for example, have a communication function such as wireless communication to communicate with an input unit 71 of second processor 70. Alternatively, output unit 45 may, for example, be an interface of a portable storage device (such as a memory card) that can be accessed by input unit 71 of second processor 70. Second processor 70 includes a display 75 corresponding to a monitor function, and can cause display 75 to display the transportation work information output from output unit 45.

<Functional Blocks in First Processor 30>

First processor 30 shown in FIG. 2 determines a loaded state of bucket 6, and when receiving, from the traveling sensor, a rearward movement state switching signal indicating that traveling apparatus 4 has performed an operation for shifting from a rearward movement state to a state other than the rearward movement state in the loaded state, calculates the load weight of bucket 6 from the detection value of the work implement sensor based on the rearward movement state switching signal. Functional blocks of first processor 30 having the above-described function will be described below.

Figure 3:
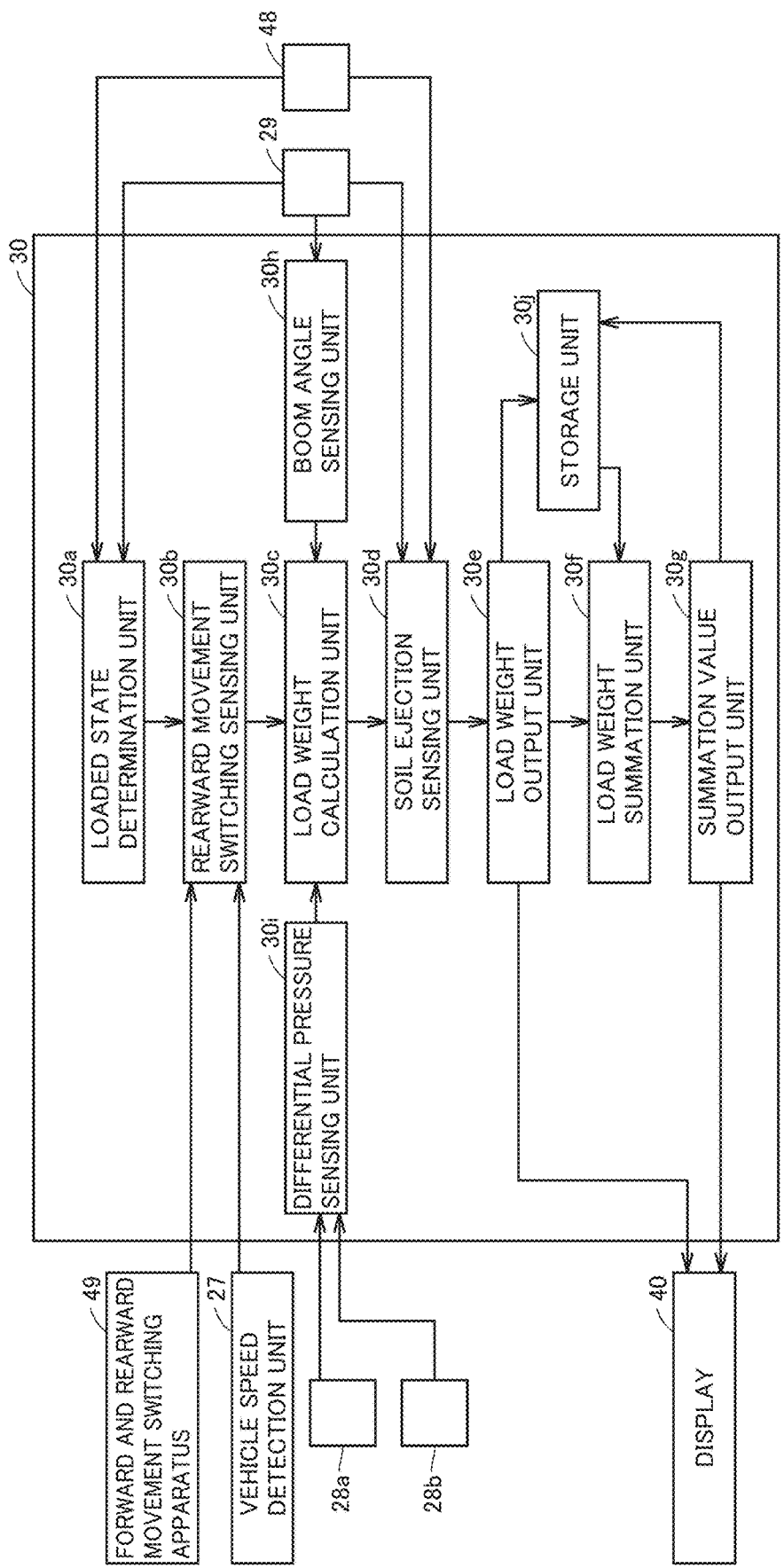
FIG. 3 shows functional blocks in a first processor.

FIG. 3 shows the functional blocks in the first processor. As shown in FIG. 3, first processor 30 mainly includes, for example, a loaded state determination unit 30*a*, a rearward movement switching sensing unit 30*b*, a load weight calculation unit 30*c*, a soil ejection sensing unit 30*d*, a load weight output unit 30*e*, a load weight summation unit 30*f*, a summation value output unit 30*g*, a boom angle sensing unit 30*h*, a differential pressure sensing unit 30*i*, and a storage unit 30*j*.

Loaded state determination unit 30*a* determines whether bucket 6 is in a loaded state or in an unloaded state. Based on the detection signal indicating the boom angle which is output from first angle detector 29 and the detection signal indicating the bucket angle which is output from second angle detector 48, loaded state determination unit 30*a* determines whether or not work implement 3 has performed the excavation operation or the piling operation. When work implement 3 has performed the excavation operation, bucket 6 is in the loaded state in which bucket 6 contains a load (excavated object) such as soil therein. In contrast, when work implement 3 has performed the piling operation, bucket 6 is in the unloaded state in which bucket 6 is empty. A determination signal from loaded state determination unit 30*a* is output to rearward movement switching sensing unit 30*b*.

Rearward movement switching sensing unit 30*b* senses the traveling state of traveling apparatus 4, based on at least one of the detection signal (forward movement, neutral, rearward movement) about the forward and rearward movement instruction output from forward and rearward movement switching apparatus 49 and the detection signal indicating the vehicle speed of wheel loader 1 which is output from vehicle speed detection unit 27. After rearward movement switching sensing unit 30*b* receives the determination signal from loaded state determination unit 30*a*, rearward movement switching sensing unit 30*b* senses whether traveling apparatus 4 has been switched from the rearward movement state to a forward movement state or from the rearward movement state to a neutral state. A sensing signal about the traveling state from rearward movement switching sensing unit 30*b* is output to load weight calculation unit 30*c*.

Load weight calculation unit 30*c* calculates load weight W in bucket 6, based on a boom angle signal output from boom angle sensing unit 30*h* and a differential pressure signal output from differential pressure sensing unit 30*i*.

Boom angle sensing unit 30*h* receives the detection signal indicating the boom angle which is output from first angle detector 29, calculates a boom angle, and outputs a signal about the calculated boom angle to load weight calculation unit 30*c*.

Differential pressure sensing unit 30*i* calculates a differential pressure between the head pressure and the bottom pressure of boom cylinder 16, based on the detection signal indicating the head pressure of boom cylinder 16 which is output from pressure sensor 28*a* and the detection signal indicating the bottom pressure of boom cylinder 16 which is output from pressure sensor 28*b*, and outputs a signal about the calculated differential pressure to load weight calculation unit 30*c*.

A method for calculating load weight W in load weight calculation unit 30*c* will be described in detail below. A signal about load weight W in bucket 6 calculated by load weight calculation unit 30*c* is output to soil ejection sensing unit 30*d*.

After soil ejection sensing unit 30*d* receives the load weight signal from load weight calculation unit 30*c*, soil ejection sensing unit 30*d* determines whether or not the load (such as soil) in bucket 6 has been ejected from bucket 6. Soil ejection sensing unit 30*d* determines whether or not work implement 3 has performed a soil ejection operation, based on the detection signal indicating the boom angle which is output from first angle detector 29 and the detection signal indicating the bucket angle which is output from second angle detector 48. When work implement 3 has performed the soil ejection operation, bucket 6 is in the unloaded state in which bucket 6 is empty. In contrast, when work implement 3 has not performed the soil ejection operation, bucket 6 remains in the loaded state in which bucket 6 contains the load such as soil therein. A determination signal from soil ejection sensing unit 30*d* is output to load weight output unit 30*e*.

Load weight output unit 30*e* receives the determination signal from soil ejection sensing unit 30*d*, and outputs the load weight signal calculated by load weight calculation unit 30*c* to load weight summation unit 30*f*, storage unit 30*j* and display 40. Storage unit 30*j* stores load weight W output from load weight output unit 30*e*. Display 40 displays load weight W on a screen and the like. Load weight output unit 30*e* may also output the load weight signal to output unit 45 (FIG. 2). The load weight signal output to output unit 45 may be output to second processor 70 and displayed on display 75 of second processor 70.

Load weight summation unit 30*f* receives the load weight signal from load weight output unit 30*e*, and adds the current load weight to the previous load weights stored in storage unit 30*j*. Load weight summation unit 30*f* outputs a signal about a summation value of the summed load weights to summation value output unit 30*g*.

Summation value output unit 30*g* receives the summation value signal from load weight summation unit 30*f*, and outputs the summation value signal obtained by summation in load weight summation unit 30*f* to storage unit 30*j* and display 40. Storage unit 30*j* stores the summation value of load weights W output from summation value output unit 30*g*. Display 40 displays the summation value of load weights W on the screen and the like. Summation value output unit 30*g* may also output the summation value signal to output unit 45 (FIG. 2). The summation value signal output to output unit 45 may be output to second processor 70 and displayed on display 75 of second processor 70.

<Method for Calculating Instantaneous Load W>

Next, an outline of a method for calculating an instantaneous load W will be described first.

Figure 4:
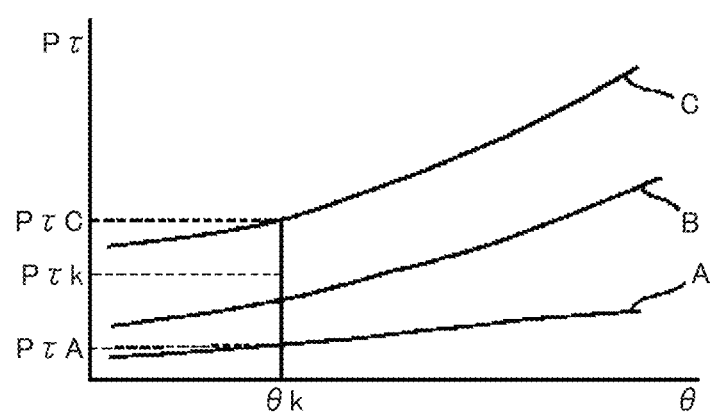
FIG. 4 shows a relationship between a boom angle and a differential pressure for each instantaneous load.
Figure 5:
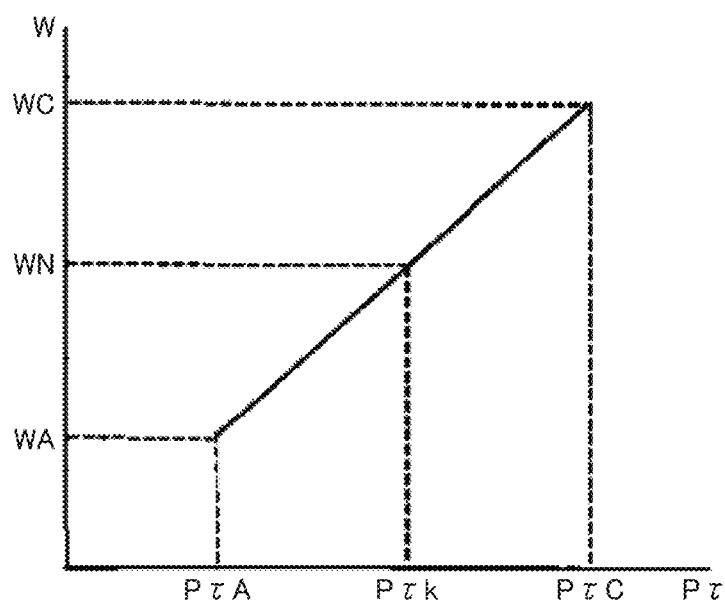
FIG. 5 shows a relationship between a differential pressure and a load weight at a certain boom angle.

FIG. 4 shows one example of a relationship between a boom angle θ and a differential pressure Pτ for each instantaneous load W. In FIG. 4, curves A, B and C represent a case in which bucket 6 is empty, a case in which bucket 6 is loaded half, and a case in which bucket 6 is fully loaded, respectively. Based on a graph of a relationship between boom angle θ and differential pressure Pτ at two or more instantaneous loads W measured preliminarily, a graph of a relationship between instantaneous load W and differential pressure Pτ for each boom angle θ as shown in FIG. 5 can be obtained. Therefore, when boom angle θ and differential pressure Pτ are known, an instantaneous load WN in each differential pressure sampling can be obtained.

Assuming, for example, that boom angle θ=θk and differential pressure Pτ=Pτk at a certain time mk as shown in FIG. 4, instantaneous load WN can be obtained from FIG. 5. That is, FIG. 5 is a graph indicating a relationship between the differential pressure and instantaneous load W at boom angle θ=θk. In FIG. 5, PτA refers to a differential pressure when bucket 6 is empty at boom angle θ=θk. WA refers to an instantaneous load in the unloaded state at boom angle θ=θk. PτC refers to a differential pressure when bucket 6 is fully loaded at boom angle θ=θk. WC refers to an instantaneous load in the fully-loaded state at boom angle θ=θk. When Pτk is located between PτA and PτC, instantaneous load WN is determined by linear interpolation. Alternatively, instantaneous load WN can also be obtained based on a numerical table that prestores the above-described relationship.

<Excavation and Loading Operation and Determination Thereof>

Figure 6:
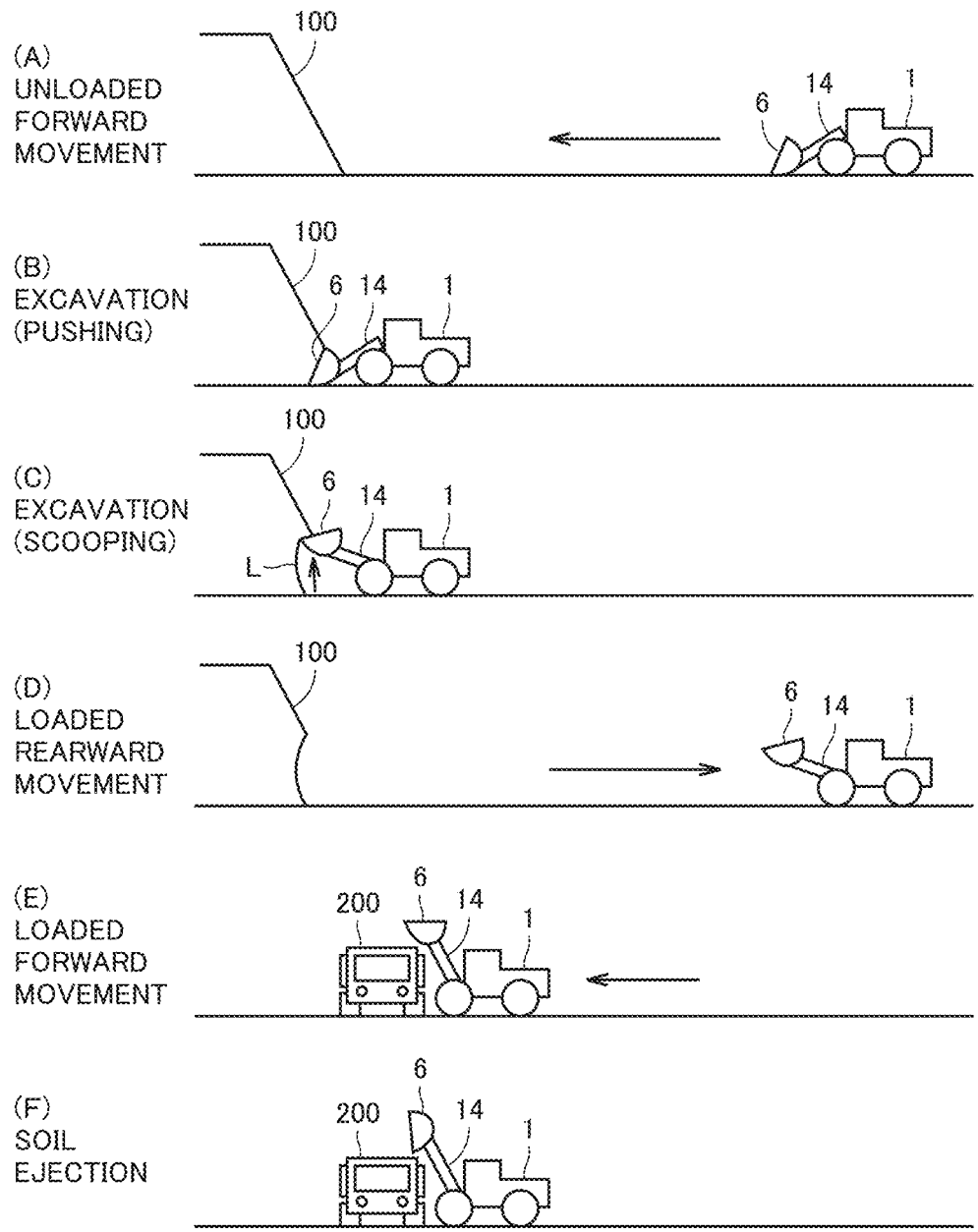
FIG. 6 is a schematic view showing a series of steps such as an excavation work and a loading work by the wheel loader.

Wheel loader 1 according to the present embodiment performs the excavation operation for scooping an excavated object such as soil into bucket 6, and the loading operation for loading the load (excavated object 100) in bucket 6 into a transportation machine such as a dump truck 200. FIG. 6 is a schematic view showing an example of a series of steps that form the excavation operation and the loading operation of wheel loader 1 based on the embodiment. By repeating the sequential execution of a plurality of steps described below, wheel loader 1 excavates excavated object 100 and loads excavated object 100 into the transportation machine such as dump truck 200.

As shown in FIG. 6(A), wheel loader 1 moves forward toward excavated object 100. In this unloaded forward movement step, the operator operates boom cylinder 16 and tilt cylinder 19 to cause work implement 3 to take an excavation posture in which the tip of boom 14 is located at a low position and bucket 6 faces horizontally, and causes wheel loader 1 to move forward toward excavated object 100.

As shown in FIG. 6(B), the operator causes wheel loader 1 to move forward until cutting edge 6a of bucket 6 bites into excavated object 100. In this excavation (pushing) step, cutting edge 6a of bucket 6 bites into excavated object 100.

As shown in FIG. 6(C), the operator then operates boom cylinder 16 to raise bucket 6, and operates tilt cylinder 19 to tilt back bucket 6. As a result of this excavation (scooping) step, bucket 6 is raised along a bucket trace L as shown by a curved arrow in the figure, and excavated object 100 is scooped into bucket 6. Thus, the excavation work for scooping excavated object 100 is performed.

Depending on the type of excavated object 100, the scooping step may be completed simply by tilting back bucket 6 once. Alternatively, an operation for tilting back bucket 6 to bring bucket 6 into neutral, and then, tilting back bucket 6 again may be repeated in the scooping step.

As shown in FIG. 6(D), after excavated object 100 is scooped into bucket 6, the operator causes wheel loader 1 to move rearward in a loaded rearward movement step. The operator may perform boom-raising during rearward movement, or may perform boom-raising during forward movement in FIG. 6(E).

As shown in FIG. 6(E), the operator causes wheel loader 1 to move forward and come closer to dump truck 200, while maintaining bucket 6 in the raised state or while raising bucket 6. As a result of this loaded forward movement step, bucket 6 is located substantially directly above a truck bed of dump truck 200.

As shown in FIG. 6(F), the operator dumps bucket 6 at a prescribed position, and loads the load (excavated object) in bucket 6 onto the truck bed of dump truck 200. This step is a so-called soil ejection step. Thereafter, the operator lowers boom 14 while causing wheel loader 1 to move rearward, and returns bucket 6 to the excavation posture.

The above are the typical steps that form one cycle of the excavation and loading work.

Figure 7:
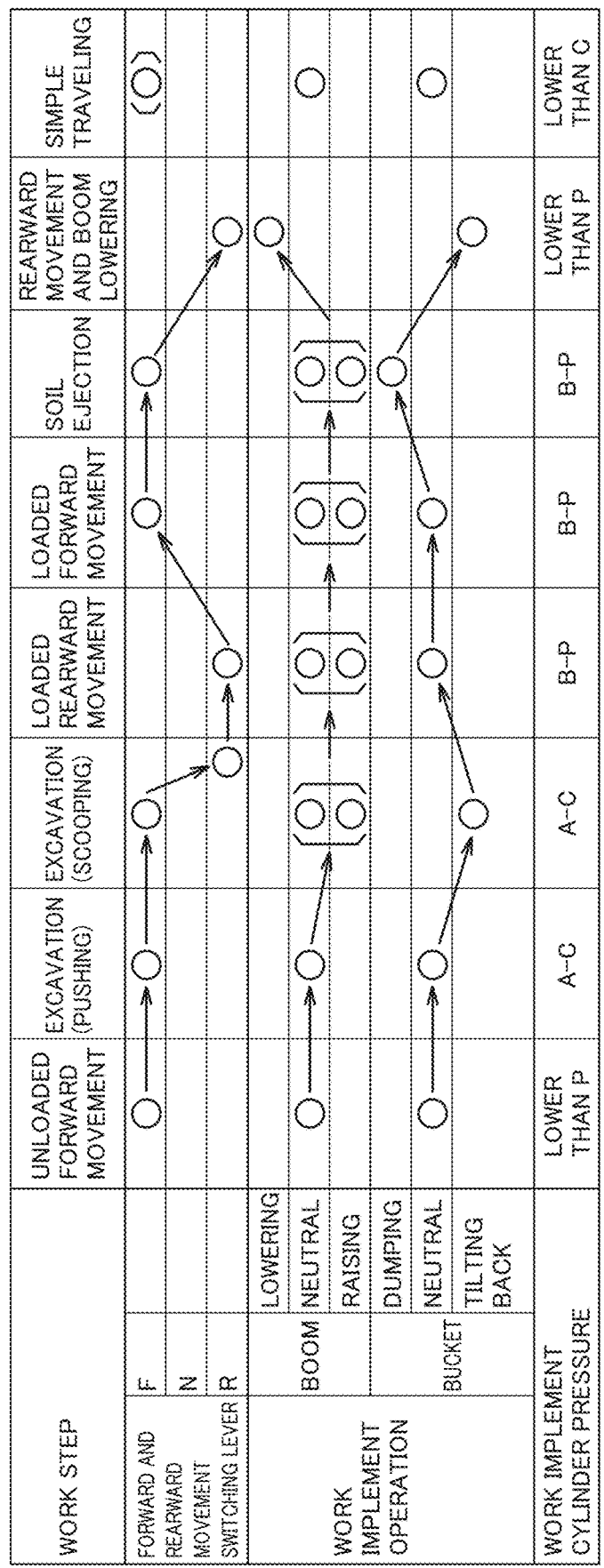
FIG. 7 is a table showing a determination method in the series of steps such as the excavation work and the loading work by the wheel loader.

FIG. 7 is a table showing a determination method in the series of steps that form the excavation work and the loading work of wheel loader 1.

In the table shown in FIG. 7, the uppermost line of "work step" shows the designation of the work step shown in each of FIGS. 6(A) to 6(F). The lines of "forward and rearward movement switching lever", "work implement operation" and "work implement cylinder pressure" below the uppermost line show various determination criteria used by first processor 30 (FIGS. 2 and 3) to determine which step a current work step is.

More specifically, the line of "forward and rearward movement switching lever" shows a determination criterion about the forward and rearward movement switching lever, using a circle mark.

The line of "work implement operation" shows a determination criterion about an operation performed on work implement 3 by the operator, using a circle mark. More specifically, the line of "boom" shows a determination criterion about an operation performed on boom 14, and the line of "bucket" shows a determination criterion about an operation performed on bucket 6.

The line of "work implement cylinder pressure" shows a determination criterion about a current hydraulic pressure of a cylinder of work implement 3, e.g., a hydraulic pressure of the cylinder bottom chamber of boom cylinder 16. Four reference values A, B, C, and P are preset for the hydraulic pressure, and a plurality of pressure ranges (a range lower than reference value P, a range from reference values A to C, a range from reference values B to P, and a range lower than reference value C) are defined based on these reference values A, B, C, and P, and these pressure ranges are set as the above-described determination criterion. The magnitude of four reference values A, B, C, and P is defined as A>B>C>P.

By using a combination of determination criteria for "forward and rearward movement switching lever", "boom", "bucket", and "work implement cylinder pressure" for each work step as described above, first processor 30 can determine which step a current step is.

A specific operation of first processor 30 when performing the control shown in FIG. 7 will be described below.

A combination of determination criteria for "forward and rearward movement switching lever", "boom", "bucket", and "work implement cylinder pressure" corresponding to each work step shown in FIG. 7 is prestored in storage unit 30j (FIG. 2). First processor 30 recognizes the currently selected forward and rearward movement switching lever (F, N or R), based on a signal from forward and rearward movement switching apparatus 49. First processor 30 recognizes a type (lowering, neutral or raising) of a current operation performed on boom 14, based on a signal from boom operation detection unit 52*b*. First processor 30 recognizes a type (dumping, neutral or tilting back) of a current operation performed on bucket 6, based on a signal from bucket operation detection unit 54*b*. Furthermore, first processor 30 recognizes a current hydraulic pressure of the cylinder bottom chamber of boom cylinder 16, based on a signal from pressure sensor 28*b* shown in FIG. 2.

First processor 30 compares a combination of the recognized current forward and rearward movement switching lever, boom operation type, bucket operation type, and lift cylinder hydraulic pressure (i.e., a current work state) with the prestored combination of determination criteria for "forward and rearward movement switching lever", "boom", "bucket", and "work implement cylinder pressure" corresponding to each work step. As a result of this comparison process, first processor 30 determines which work step the combination of determination criteria matching the current work state best corresponds to.

Specifically, the combination of determination criteria corresponding to the excavation and loading operation shown in FIG. 6 is as follows.

In the unloaded forward movement step, the forward and rearward movement switching lever is F, the boom operation and the bucket operation are both neutral, and the work implement cylinder pressure is lower than reference value P.

In the excavation (pushing) step, the forward and rearward movement switching lever is F, the boom operation and the bucket operation are both neutral, and the work implement cylinder pressure is in the range from reference values A to C.

In the excavation (scooping) step, the forward and rearward movement switching lever is F or R, the boom operation is raising or neutral, the bucket operation is tilting back, and the work implement cylinder pressure is in the range from reference values A to C. As to the bucket operation, a determination criterion that tilting back and neutral are alternately repeated may be further added. This is because, depending on the state of the excavated object, the operation for tilting back bucket 6 to bring bucket 6 into neutral, and then, tilting back bucket 6 again may be repeated.

In the loaded rearward movement step, the forward and rearward movement switching lever is R, the boom operation is neutral or raising, the bucket operation is neutral, and the work implement cylinder pressure is in the range from reference values B to P.

In the loaded forward movement step, the forward and rearward movement switching lever is F, the boom operation is raising or neutral, the bucket operation is neutral, and the work implement cylinder pressure is in the range from reference values B to P.

In the soil ejection step, the forward and rearward movement switching lever is F, the boom operation is raising or neutral, the bucket operation is dumping, and the work implement cylinder pressure is in the range from reference values B to P.

In the rearward movement and boom lowering step, the forward and rearward movement switching lever is R, the boom operation is lowering, the bucket operation is tilting back, and the work implement cylinder pressure is lower than reference value P.

<Flow of Measurement of Load Weight W>

In the above-described excavation and loading operation, wheel loader 1 according to the present embodiment measures load weight W in bucket 6 and calculates the summation value of load weights W.

Figure 8:
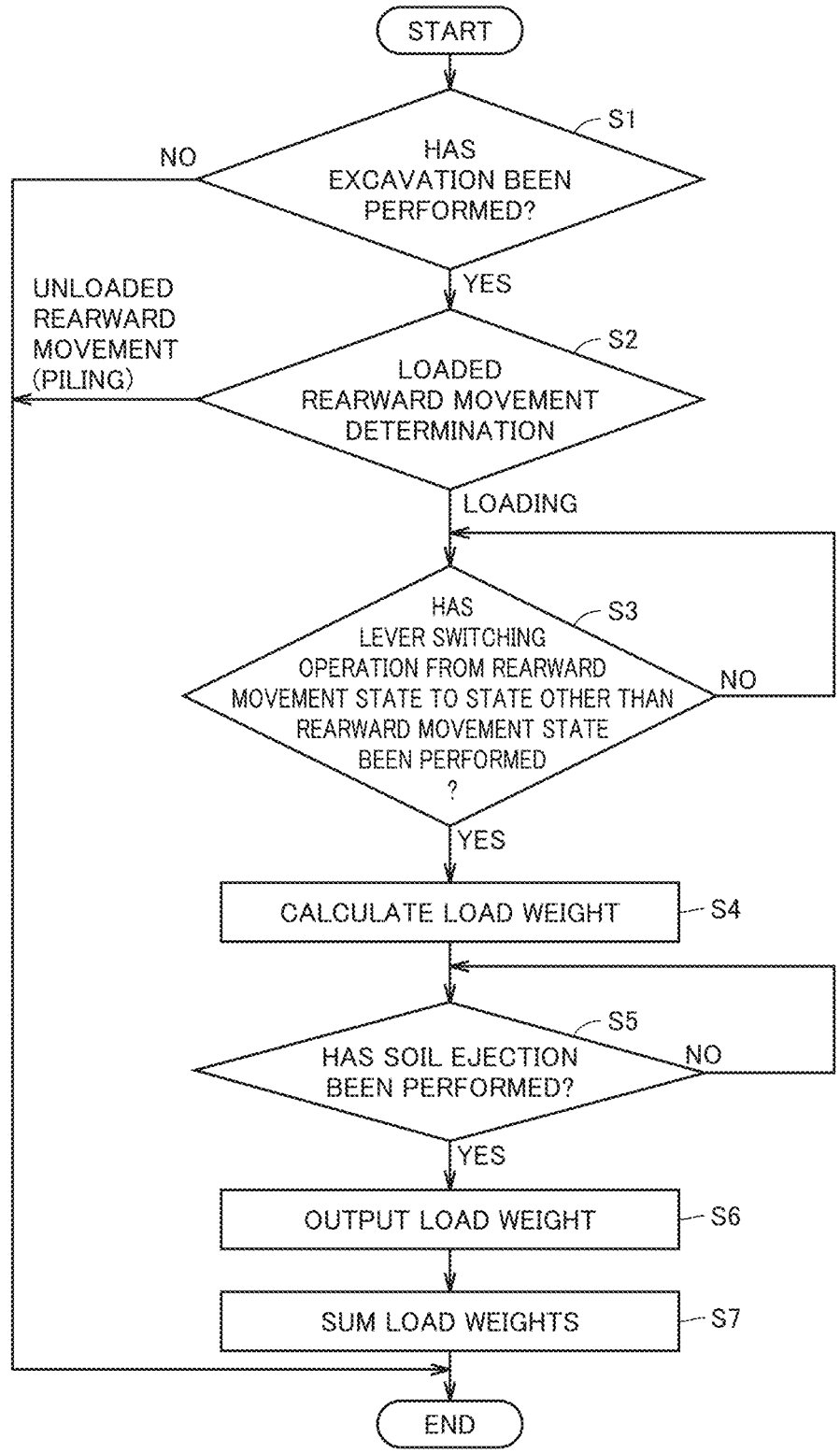
FIG. 8 is a flowchart showing a method for controlling the work vehicle according to the embodiment.

FIG. 8 is a flowchart showing a method for controlling the work vehicle including a method for measuring the load weight in the above-described excavation and loading operation.

As shown in FIGS. 6 and 7, in the excavation and loading operation, wheel loader 1 moves forward toward the excavated object. As shown in FIGS. 6(A) and 6(B), wheel loader 1 moves forward toward excavated object 100 and until cutting edge 6*a* of bucket 6 bites into excavated object 100.

Thereafter, as shown in FIG. 6(C), boom 14 is raised and bucket 6 is tilted back. As a result, excavated object 100 is scooped into bucket 6. Excavation is thus performed.

At this point of time, it is determined whether or not excavation has been performed, as shown in FIG. 8 (step S1).

As shown in FIG. 8, a loaded rearward movement determination is then performed (step S2). Specifically, when bucket 6 is dumped after excavated object 100 is scooped into bucket 6 and before wheel loader 1 moves rearward, the piling operation or the like is performed and it is determined that wheel loader 1 is in the unloaded rearward movement state. In contrast, when wheel loader 1 moves rearward without dumping bucket 6 after excavated object 100 is scooped into bucket 6, the bucket loading operation is performed and it is determined that bucket 6 is in the loaded state. "Loaded" herein refers to a state in which bucket 6 contains the load therein, and "unloaded" refers to a state in which bucket 6 does not contain the load therein.

This loaded rearward movement determination is performed in loaded state determination unit 30*a* and rearward movement switching sensing unit 30*b* of first processor 30 shown in FIG. 3. A determination as to whether or not bucket 6 has been dumped (determination as to whether or not bucket 6 is in the loaded state) is performed based on the detection signal (sensor signal) indicating the bucket angle which is output from second angle detector 48 included in the work implement sensor. When bucket 6 has been dumped, it is determined that the piling operation or the like has been performed. When wheel loader 1 moves rearward without dumping bucket 6, it is determined that the bucket loaded rearward movement operation has been performed.

As shown in FIG. 8, when it is determined that the dumping operation such as the piling operation has been performed, the flow of measurement of load weight W ends. In contrast, when it is determined that the bucket loading operation has been performed, wheel loader 1 moves rearward, with bucket 6 remaining in the loaded state. At this time, wheel loader 1 moves rearward as shown in FIG. 6(D).

As shown in FIG. 8, when wheel loader 1 moves rearward to a prescribed position, it is determined whether or not the operator has shifted wheel loader 1 from the rearward movement state to a state other than the rearward movement state (step S3). A state other than the rearward movement state refers to the forward movement state or the neutral (stop) state. The shift from the rearward movement state to a state other than the rearward movement state is sensed by rearward movement switching sensing unit 30*b* shown in FIG. 3.

The shift from the rearward movement state to a state other than the rearward movement state is sensed based on, for example, whether or not the operator has operated forward and rearward movement switching operation member 49a of forward and rearward movement switching apparatus 49 shown in FIG. 2 from the rearward movement (R) position to the forward movement (F) position or the neutral (N) position. When the traveling state has been switched from the rearward movement state to the other state, the rearward movement state switching signal (signal indicating forward movement or neutral) is output from forward and rearward movement switching apparatus 49 (forward and rearward movement switching detection sensor 49b) shown in FIG. 3 to rearward movement switching sensing unit 30b. Therefore, based on this rearward movement state switching signal, rearward movement switching sensing unit 30b can sense that the traveling state has been switched from the rearward movement state to the other state (forward movement or stop).

Alternatively, the shift from the rearward movement state to a state other than the rearward movement state may be sensed based on, for example, the movement speed of wheel loader 1 sensed by vehicle speed detection unit 27 shown in FIG. 2. When the traveling state has been switched from the rearward movement state to the other state, the movement speed of wheel loader 1 sensed by vehicle speed detection unit 27 changes from a speed in a rearward movement direction to a speed in a forward movement direction, or changes to zero. Therefore, based on the signal (rearward movement state switching signal) about the movement speed of wheel loader 1 indicating forward movement or stop which is output from vehicle speed detection unit 27, rearward movement switching sensing unit 30b shown in FIG. 3 can sense that the traveling state has been switched from the rearward movement state to the other state (forward movement or stop).

As shown in FIG. 8, when it is determined that the traveling state has not been shifted from the rearward movement state to a state other than the rearward movement state, wheel loader 1 continues to move rearward.

As shown in FIG. 8, when it is determined that the traveling state has been shifted from the rearward movement state to a state other than the rearward movement state, wheel loader 1 moves forward or stops, and load weight W in bucket 6 is calculated (step S4). Load weight W is calculated by load weight calculation unit 30c shown in FIG. 3. As described above, load weight calculation unit 30c calculates load weight W in bucket 6, based on the boom angle signal output from boom angle sensing unit 30h based on the detection value of first angle detector 29, and the differential pressure signal output from differential pressure sensing unit 30i based on the detection values of first hydraulic pressure detectors 28a and 28b.

As described above, by the above-described steps S3 and S4 shown in FIG. 8, first processor 30 shown in FIG. 3 can calculate load weight W of bucket 6 from the detection value of the work implement sensor (first hydraulic pressure detectors 28a and 28b, and first angle detector 29) based on the rearward movement state switching signal, when first processor 30 receives the rearward movement state switching signal from the traveling sensor (forward and rearward movement switching detection sensor 49b and vehicle speed detection unit 27), the rearward movement state switching signal indicating that the operation for shifting from the rearward movement state to a state other than the rearward movement state has been performed.

As shown in FIG. 8, after a prescribed time period elapses since wheel loader 1 moves forward or stops, it is sensed whether or not work implement 3 has performed the soil ejection operation (step S5). This soil ejection operation by work implement 3 is performed by dumping bucket 6 as shown in FIG. 6(F). A determination as to whether or not bucket 6 has been dumped is performed based on the detection signal indicating the bucket angle which is output from second angle detector 48 shown in FIG. 2. Therefore, as shown in FIG. 3, based on the signal about the bucket angle output from second angle detector 48, soil ejection sensing unit 30d can sense whether or not soil ejection has been performed.

As shown in FIG. 8, when the soil ejection operation by work implement 3 is not sensed, the sensing of the soil ejection operation continues. In contrast, when the soil ejection operation by work implement 3 is sensed, load weight W of the load in bucket 6 is output (step S6). Load weight W is output by load weight output unit 30e of first processor 30 shown in FIG. 3 outputting the signal about load weight W to storage unit 30j or display 40. As a result, the signal about load weight W is stored in storage unit 30j and displayed on display 40, or displayed on display 75 of second processor 70.

As described above, by steps S5 and S6 shown in FIG. 8, when the detection signal indicating the bucket angle which is output from second angle detector 48 (work implement sensor) shown in FIG. 3 is a signal (soil ejection signal) indicating soil ejection, load weight output unit 30e of first processor 30 outputs load weight W based on the soil ejection signal.

As shown in FIG. 8, load weights W are summed based on output load weight W (step S7). Load weights W are summed by load weight summation unit 30f of first processor 30 shown in FIG. 3 automatically adding the current load weight to the previous load weights stored in storage unit 30j (i.e., automatically summing a plurality of load weights). The summation value obtained by summation is output from load weight summation unit 30f and input to summation value output unit 30g. The summation value obtained by summation is stored in storage unit 30j by summation value output unit 30g and displayed on display 40, or displayed on display 75 of second processor 70.

As described above, the control of the work vehicle including measurement and summation of the load weight in the excavation and loading operation in the present embodiment is performed.

<Change in Boom Angle, Boom Bottom Pressure, Instantaneous Load, and Load Weight>

The present inventor researched a change in boom angle, boom cylinder differential pressure, instantaneous load, and load weight in the series of steps of the excavation and loading operation of wheel loader 1 according to the present embodiment. The result is shown in FIG. 9.

Figure 9:
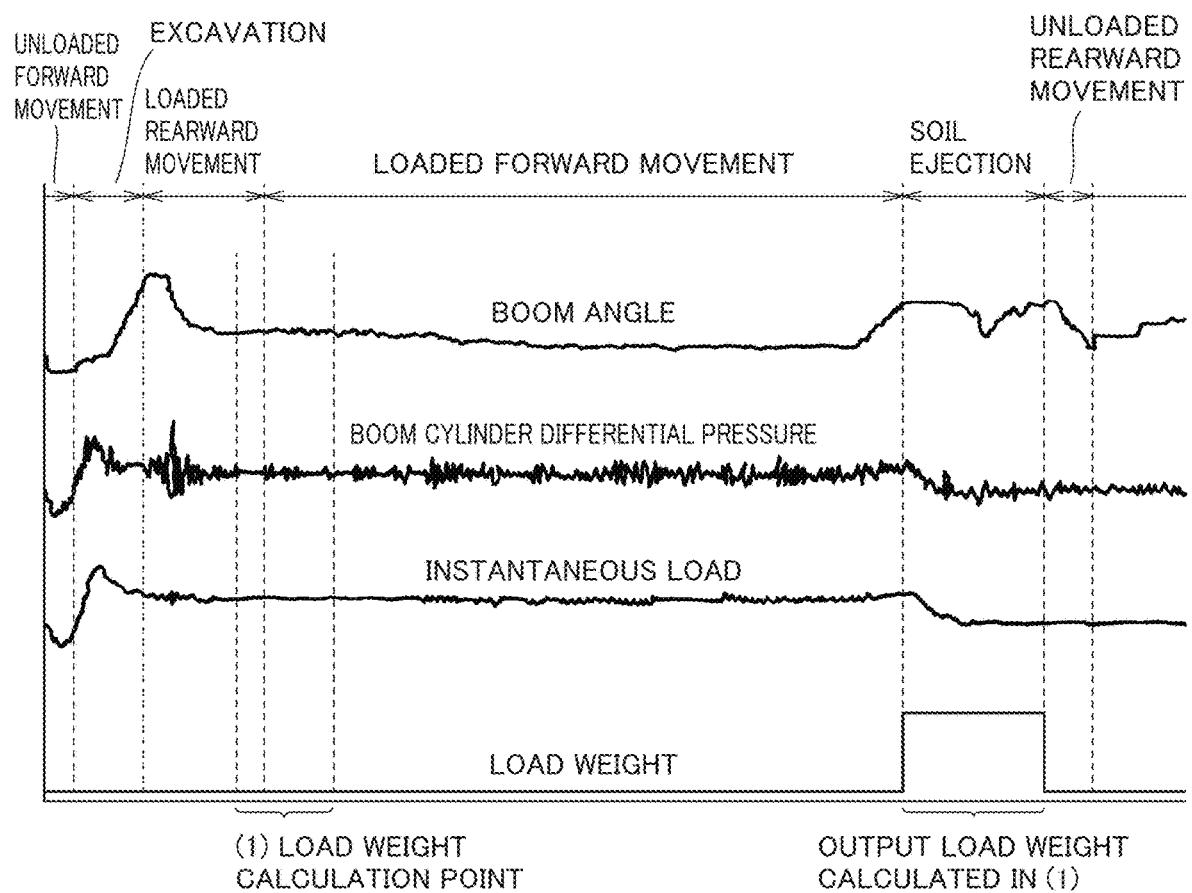
FIG. 9 shows an example of change in boom angle, boom cylinder differential pressure, instantaneous load, and load weight in the series of steps such as the excavation work and the loading work by the wheel loader.

From the result in FIG. 9, it can be seen that each of the boom angle, the boom cylinder differential pressure and the instantaneous load changes significantly during excavation and during soil ejection. It can also be seen that each of the boom angle, the boom cylinder differential pressure and the instantaneous load also changes significantly in the first half of loaded rearward movement. In contrast, in the latter half of loaded rearward movement and during loaded forward movement, a change over time in each of boom angle, boom cylinder differential pressure and instantaneous load is small. Particularly, immediately before switching from loaded rearward movement to loaded forward movement, a change over time in each of boom cylinder differential pressure and instantaneous load is very small, and thus, it can be seen that each of the boom cylinder differential pressure and the instantaneous load is stable.

Effect of Embodiment

As shown in FIG. 9, a change over time in each of boom cylinder differential pressure and instantaneous load is very small around the time when the traveling state is switched from the rearward movement state (loaded rearward movement) to the forward movement state (loaded forward movement) in the loaded state. In the present embodiment, as shown in FIGS. 3 and 6, the load weight of bucket 6 is calculated based on the rearward movement state switching signal indicating that traveling apparatus 4 has performed the operation for shifting from the rearward movement state to a state other than the rearward movement state in the loaded state. As described above, in the present embodiment, load weight W is measured around the time when the traveling state is switched from the rearward movement state to the forward movement state. Since each of the boom cylinder differential pressure and the instantaneous load is stable around the time when the traveling state is switched from the rearward movement state to the forward movement state, load weight W can be accurately measured. Therefore, the load weight may be calculated based on the instantaneous load immediately after the forward and rearward movement switching lever is switched from rearward movement to forward movement.

Instead of calculating the load weight based on switching of the forward and rearward movement switching lever from rearward movement to forward movement as described above, the load weight may be calculated based on the actual vehicle speed reaching 0 km/h, or may be calculated based on the actual vehicle speed shifting to forward movement. Alternatively, the load weight may be calculated based on a combination of these.

Furthermore, the load weight is preferably calculated by the time the vehicle speed reaches 0 km/h. However, the load weight may be calculated during a time period in which the vehicle speed is equal to or lower than a prescribed speed.

In addition, depending on the size of the bucket of the wheel loader or the type of the object to be loaded, a time region in which a change over time in boom cylinder differential pressure and instantaneous load is small may vary in some cases. Therefore, the timing of calculation of the load weight may be changeable.

In addition, in the present embodiment, as shown in FIGS. 3 and 6, the loaded state of bucket 6 is determined by determining whether or not the work implement is in the piling state based on the sensor signal from the work implement sensor. Accordingly, summation of load weights W when bucket 6 is in the unloaded state can be prevented, and thus, the accurate summation value of load weights W can be obtained.

In addition, in the present embodiment, as shown in FIGS. 3 and 6, the soil ejection signal indicating that work implement 3 has ejected soil is received from the work implement sensor (e.g., second angle detector 48) and load weight W is output based on the soil ejection signal. Accordingly, output of the load weight before soil ejection can be prevented, and thus, the summation value of load weights W after soil ejection can be accurately obtained.

In addition, in the present embodiment, as shown in FIGS. 3 and 6, first processor 30 automatically sums a plurality of load weights W. Accordingly, the accurate summation value of load weights W can be obtained.

In addition, in the present embodiment, as shown in FIGS. 3 and 6, the work implement sensor includes at least one of a pressure sensor or a strain sensor. Accordingly, the degree of freedom in sensor selection is increased.

In addition, in the present embodiment, as shown in FIGS. 3 and 6, the work implement sensor further includes a work implement position sensor. Accordingly, the position of the work implement can also be detected.

In addition, in the present embodiment, as shown in FIGS. 3 and 6, the traveling sensor includes at least one of forward and rearward movement switching detection sensor 49b and vehicle speed detection unit 27. Accordingly, the operation for shifting from the rearward movement state to a state other than the rearward movement state can be sensed based on at least one of the position of forward and rearward movement switching operation member 49a in forward and rearward movement switching apparatus 49 and the vehicle speed sensed by vehicle speed detection unit 27.

Vehicle speed detection by a GPS (Global Positioning System), vehicle speed detection using a stereo camera, vehicle speed detection using a rotation sensor of a transmission output shaft, vehicle speed detection using a rotation sensor of a transmission input shaft and a transmission gear ratio, and the like may be used as the traveling sensor. The traveling sensor is not limited to the foregoing, and anything that can detect the traveling direction of the vehicular body may be used.

Although the case of calculating load weight W from the boom angle and the differential pressure between the head pressure and the bottom pressure of boom cylinder 16 has been described in the embodiment above, load weight W may be calculated from the boom angle and the bottom pressure of boom cylinder 16. In this case, pressure sensor 28a in FIG. 2 is unnecessary.

Although the case in which functional blocks 30a to 30j shown in FIG. 3 are included in first processor 30 has been described in the embodiment above, these functional blocks 30a to 30j may be included in second processor 70 shown in FIG. 2. In this case, the sensing signal from each of forward and rearward movement switching apparatus 49, vehicle speed detection unit 27, first hydraulic pressure detectors 28a and 28b, first angle detector 29, and second angle detector 48 may be output to second processor 70 through output unit 45 shown in FIG. 2.

In addition, boom operation apparatus 52 and bucket operation apparatus 54 may be an integrated steering lever (single lever). In this case, one steering lever serves as both boom operation apparatus 52 and bucket operation apparatus 54.

In addition, second processor 70 shown in FIG. 2 may receive and transmit an electric/radio signal to and from output unit 45 by a CAN (Controller Area Network), a LAN (Local Area Network), a wireless LAN and the like.

In addition, second processor 70 may receive the input information of first processor 30 and perform a computation.

In addition, in the embodiment above, wheel loader 1 shown in FIG. 1 has been described by way of example of a work vehicle to which the configuration of the above-described embodiment is applied. However, in addition to wheel loader 1, the work vehicle to which the configuration of the above-described embodiment is applied may be a work vehicle including bucket 6 and being capable of moving forward and rearward, and may be, for example, a backhoe loader.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 wheel loader; 2 vehicular body frame; 3 work implement; 4 traveling apparatus; 4a front wheel; 4b rear wheel; 5 cab; 6 bucket; 6a cutting edge; 10 boom pin; 11 front frame; 12 rear frame; 13 steering cylinder; 14 boom; 15 tilt rod; 16 boom cylinder; 17 bucket pin; 18 bell crank; 18a support pin; 19 tilt cylinder; 20 engine; 21 input shaft; 22 motive power extraction unit; 23 motive power transfer mechanism; 23a output shaft; 24 cylinder driving unit; 25 work implement pump; 26 control valve; 27 vehicle speed detection unit; 28a, 28b first hydraulic pressure detector (pressure sensor); 29 first angle detector; 30 first processor; 30a loaded state determination unit; 30b rearward movement switching sensing unit; 30c load weight calculation unit; 30d soil ejection sensing unit; 30e load weight output unit; 30f load weight summation unit; 30g summation value output unit; 30h boom angle sensing unit; 30i differential pressure sensing unit; 30j storage unit; 40, 75 display; 45 output unit; 48 second angle detector; 49 forward and rearward movement switching apparatus; 49a forward and rearward movement switching operation member; 49b forward and rearward movement switching detection sensor; 51 accelerator operation apparatus; 51a accelerator operation member; 51b accelerator operation detection unit; 52 boom operation apparatus; 52a boom operation member; 52b boom operation detection unit; 53 speed change operation apparatus; 53a speed change operation member; 53b speed change operation detection unit; 54 bucket operation apparatus; 54a bucket operation member; 54b bucket operation detection unit; 58 brake operation apparatus; 58a brake operation member; 58b brake operation detection unit; 70 second processor; 71 input unit; 100 excavated object; 200 dump truck; W load weight.

The invention claimed is:

1. A work vehicle comprising:
a vehicular body;
a boom;
a boom cylinder coupled to the boom and that drives the boom;
a work implement attached to the vehicular body and including a bucket;
a traveling apparatus attached to the vehicular body and causing the vehicular body to travel;
a work implement sensor that senses a state of the work implement, the work implement sensor including i) a pressure sensor that detects a pressure of the boom cylinder, and ii) an angle sensor that detects an angle of the boom;
a traveling sensor that senses a traveling state of the traveling apparatus; and
a controller that determines a loaded state of the bucket, wherein when the traveling sensors senses that the traveling apparatus shifts from a rearward movement state to a state other than the rearward movement state in the loaded state, the controller calculates a load weight of the bucket based on the detected pressure of the boom cylinder and the detect angle of the boom.

2. The work vehicle according to claim 1, wherein
the controller determines the loaded state of the bucket by determining whether or not the work implement is in the loaded state based on a sensor signal from the work implement sensor.

3. The work vehicle according to claim 1, wherein
the controller receives, from the work implement sensor, a soil ejection signal indicating that the work implement has ejected soil, and the controller further calculates the load weight based on the soil ejection signal.

4. The work vehicle according to claim 1, wherein
the controller automatically sums a plurality of load weights.

5. The work vehicle according to claim 1, wherein
the work implement sensor further includes at least one of a second pressure sensor and a strain sensor.

6. The work vehicle according to claim 5, wherein
the work implement sensor further includes a work implement position sensor.

7. The work vehicle according to claim 6, wherein
the work implement position sensor is a cylinder stroke sensor or a work implement angle sensor.

8. The work vehicle according to claim 7, wherein
the traveling sensor includes an FNR switching lever that can perform switching among forward movement, neutral and rearward movement.

9. The work vehicle according to claim 1, wherein
the traveling sensor includes a vehicle speed detection unit.

10. A system including a work vehicle, the system comprising:
a vehicular body;
a boom;
a boom cylinder coupled to the boom and that drives the boom;
a work implement attached to the vehicular body and including a bucket;
a traveling apparatus attached to the vehicular body and causing the vehicular body to travel;
a work implement sensor that senses a state of the work implement, the work implement sensor including i) a pressure sensor that detects a pressure of the boom cylinder, and ii) an angle sensor that detects an angle of the boom;
a traveling sensor that senses a traveling state of the traveling apparatus; and
a controller that determines a loaded state of the bucket, wherein when the traveling sensor senses that the traveling apparatus shifts from a rearward movement state to a state other than the rearward movement state in the loaded state, the controller calculates a load weight of the bucket based on the detected pressure of the boom cylinder and the detect angle of the boom.

11. A load weight calculation method for a work vehicle, the work vehicle comprising: a vehicular body; a boom; a boom cylinder coupled to the boom and that drives the boom; a work implement attached to the vehicular body and including a bucket; a traveling apparatus attached to the vehicular body and causing the vehicular body to travel; a work implement sensor that senses a state of the work implement, the work implement sensor including i) a pressure sensor that detects a pressure of the boom cylinder, and ii) an angle sensor that detects an angle of the boom; and a traveling sensor that senses a traveling state of the traveling apparatus, the method comprising:
determining a loaded state of the bucket; and
when the traveling sensor senses that the traveling apparatus shifts from a rearward movement state to a state other than the rearward movement state in the loaded state, calculating a load weight of the bucket based on the detected pressure of the boom cylinder and the detect angle of the boom.

* * * * *